(12) United States Patent
You

(10) Patent No.: US 10,789,100 B2
(45) Date of Patent: Sep. 29, 2020

(54) SYSTEM, APPARATUS AND METHOD FOR RESOURCE PROVISIONING

(71) Applicant: Alibaba Group Holding Limited, George Town, Grand Cayman (KY)

(72) Inventor: Liang You, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 321 days.

(21) Appl. No.: 15/130,382

(22) Filed: Apr. 15, 2016

(65) Prior Publication Data

US 2016/0306673 A1 Oct. 20, 2016

(30) Foreign Application Priority Data

Apr. 15, 2015 (CN) .......................... 2015 1 0177031

(51) Int. Cl.
*G06F 9/50* (2006.01)
(52) U.S. Cl.
CPC .......... *G06F 9/5038* (2013.01); *G06F 9/5044* (2013.01); *Y02D 10/22* (2018.01)
(58) Field of Classification Search
None
See application file for complete search history.

(56) References Cited

U.S. PATENT DOCUMENTS

| | | | |
|---|---|---|---|
| 4,658,351 A * | 4/1987 | Teng | ...................... G06F 9/4881 718/103 |
| 6,272,481 B1 | 8/2001 | Lawrence et al. | |
| 6,363,411 B1 | 3/2002 | Dugan et al. | |
| 6,425,005 B1 | 7/2002 | Dugan et al. | |
| 6,779,030 B1 | 8/2004 | Dugan et al. | |
| 6,785,880 B1 | 8/2004 | Beisiegel et al. | |
| 6,804,711 B1 | 10/2004 | Dugan et al. | |
| 7,061,923 B2 | 6/2006 | Dugan et al. | |
| 7,209,964 B2 | 4/2007 | Dugan et al. | |
| 7,463,890 B2 | 12/2008 | Herz et al. | |
| 7,493,406 B2 | 2/2009 | Amini et al. | |
| 7,613,848 B2 | 11/2009 | Amini et al. | |
| 7,697,415 B2 | 4/2010 | Dugan et al. | |
| 7,757,214 B1 * | 7/2010 | Palczak | ................. G06F 9/5083 709/223 |

(Continued)

FOREIGN PATENT DOCUMENTS

| | | |
|---|---|---|
| CN | 104077189 | 10/2014 |
| CN | 104346221 | 2/2015 |

(Continued)

*Primary Examiner* — Jung W Kim
*Assistant Examiner* — Bruce S Ashley

(57) ABSTRACT

A method of resource provisioning including obtaining component metric information of one or more processing nodes, where the one or more processing nodes form a pool of processing nodes managed by the provisioning apparatus. The method also includes obtaining task characteristics of a target task executing on one or more processing nodes of a first set, where the one or more processing nodes of the first set are selected from the pool of processing nodes. The method further includes determining one or more processing nodes of a second set from the pool of processing nodes based on the task characteristics and the component metric information and the step of deploying the target task to the one or more processing nodes in the second set.

19 Claims, 6 Drawing Sheets

(56) References Cited

U.S. PATENT DOCUMENTS

| | | |
|---|---|---|
| 7,792,836 B2 | 9/2010 | Taswell |
| 7,933,855 B2 | 4/2011 | Nauck et al. |
| 8,112,527 B2 | 2/2012 | Kawato |
| 8,175,863 B1 | 5/2012 | Ostermeyer et al. |
| 8,244,932 B2 | 8/2012 | Amini et al. |
| 8,281,012 B2 | 10/2012 | Pu et al. |
| 8,352,658 B2 | 1/2013 | Tarta et al. |
| 8,392,930 B2 | 3/2013 | Goldin |
| RE44,606 E | 11/2013 | Herz et al. |
| 8,601,178 B2 | 12/2013 | Amini et al. |
| 8,667,019 B2 | 3/2014 | Mehra et al. |
| 8,667,020 B2 | 3/2014 | Zhaofu et al. |
| 8,676,762 B2 | 3/2014 | Pafumi et al. |
| 8,683,466 B2 | 3/2014 | Raj Seeniraj et al. |
| 8,738,972 B1 * | 5/2014 | Bakman ............ G06F 11/0712 714/47.1 |
| 8,881,164 B2 | 11/2014 | Martinka et al. |
| 8,935,702 B2 | 1/2015 | Harris et al. |
| 8,949,188 B2 | 2/2015 | Pafumi et al. |
| 8,954,981 B2 | 2/2015 | Harris et al. |
| 9,003,416 B2 | 4/2015 | Gangemi et al. |
| 9,052,954 B2 | 6/2015 | Gangemi et al. |
| 2007/0240161 A1 | 10/2007 | Prabhakar et al. |
| 2008/0086734 A1 * | 4/2008 | Jensen ............... G06F 9/4881 718/104 |
| 2009/0119301 A1 | 5/2009 | Cherkasova et al. |
| 2011/0145153 A1 | 6/2011 | Dawson et al. |
| 2011/0219208 A1 | 9/2011 | Asaad et al. |
| 2011/0307903 A1 * | 12/2011 | Vaddagiri ............ G06F 9/5088 718/105 |
| 2012/0284408 A1 * | 11/2012 | Dutta .................. G06F 9/5066 709/226 |
| 2012/0317578 A1 * | 12/2012 | Kansal ................ G06F 9/5077 718/104 |
| 2013/0024494 A1 * | 1/2013 | Guarrieri ............ G06F 9/5061 709/203 |
| 2013/0151879 A1 | 6/2013 | Thomson et al. |
| 2013/0339419 A1 * | 12/2013 | Emaru ................ G06F 9/4856 709/201 |
| 2014/0038002 A1 | 2/2014 | Kumeuchi et al. |
| 2014/0201757 A1 | 7/2014 | Bird et al. |
| 2014/0304393 A1 * | 10/2014 | Annannalaisanni .... H04L 43/04 709/224 |
| 2014/0331222 A1 | 11/2014 | Zheng |

FOREIGN PATENT DOCUMENTS

| | | | |
|---|---|---|---|
| CN | 104407915 | 3/2015 | |
| CN | 104468407 | 3/2015 | |
| CN | 104484233 | 4/2015 | |
| JP | 5421305 | * 2/2014 | ............ G06F 9/46 |
| WO | 2014032477 A1 | 3/2014 | |

* cited by examiner

SYSTEM, APPARATUS AND METHOD FOR RESOURCE PROVISIONING

CROSS REFERENCE TO RELATED APPLICATION

This application claims benefit of priority to Chinese Patent Application No. 201510177031.9, filed on Apr. 15, 2015, which is incorporated herein by reference in its entirety.

TECHNICAL FIELD

Embodiments of the present invention relate generally to computer technologies, and more particularly to a system, method and apparatus for provisioning of computing resources.

BACKGROUND

With the advent of big data and developments of technologies like cloud computing and heterogeneous networks etc., procuring a multitude of computing resources and servicing workloads of large amounts of data processing are in rapid development. The result of which leads to heightened demands for resource provisioning. The prior art provisioning technology typically provides resource provisioning by comparing the configuration of hardware components and the execution conditions thereof with the resource requirements of tasks to be processed, and of course matching the resources to the tasks.

However, the prior art technology of resources provisioning may incur randomness, may at times be unable to accurately determine the demands of the tasks, and is only capable of specifying static demands such as, for example, the number of execution nodes, the number of CPU cores, the size of the memory and the size of the disk space, etc. Consequently, without accurate matching of the specific characteristics of executing tasks to resources, problems of resource usage imbalance and large power consumption associated with the task execution persist.

SUMMARY

According to an exemplary embodiment of the present disclosure, a method of resource provisioning by a provisioning apparatus includes the step of obtaining component metric information of one or more processing nodes, where the one or more processing nodes form a pool of processing nodes managed by the provisioning apparatus. The method also includes the step of obtaining task characteristics of a target task executing on one or more processing nodes of a first set, where the one or more processing nodes of the first set are selected from the pool of processing nodes. The method further includes the step of determining one or more processing nodes of a second set from the pool of processing nodes based on the task characteristics and the component metric information and the step of deploying the target task to the one or more processing nodes in the second set.

According to another exemplary embodiment of the present disclosure, a method of resource provisioning by a processing node includes the step of measuring component metric information of the processing node and transmitting the measured component metric information to a corresponding provisioning apparatus. The method also includes the step of obtaining task characteristics of a target task during execution of the target task on the processing node and the step of transmitting the task characteristics to the provisioning apparatus.

According to yet another exemplary embodiment of the present disclosure, a resource provisioning apparatus includes a component metric information obtaining module configured to obtain component metric information of one or more processing nodes, where the one or more processing nodes form a pool of processing nodes managed by the resource provisioning apparatus. The provisioning apparatus also includes a task characteristic obtaining module configured to obtain task characteristics of a target task executing on one or more processing nodes of a first set, where the one or more processing nodes of the first set are selected from the pool of processing nodes. The provisioning apparatus further includes a matching module configured to determine one or more processing nodes of a second set from the pool of processing nodes based on the task characteristics and the component metric information and a deployment module configured to deploy the target task to the one or more processing nodes in the second set.

According to still yet another exemplary embodiment of the present disclosure, a processing node for resource provisioning includes a component metric information measuring module configured to measure component metric information of the processing node and transmit the measured component metric information to a corresponding provisioning apparatus. The processing node also includes a task characteristic obtaining module configured to obtain task characteristics of a target task during execution of the target task on the processing node and a task characteristic transmitting module configured to transmit the task characteristics to the provisioning apparatus.

DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the disclosure do not inherently indicate any particular order nor imply any limitations in the disclosure.

Embodiments of the present disclosure are discussed herein with reference to FIGS. 1-7. However, those skilled in the art will readily appreciate that the detailed description given herein with respect to these figures is for explanatory purposes as the disclosure extends beyond these limited embodiments.

Figure 1:
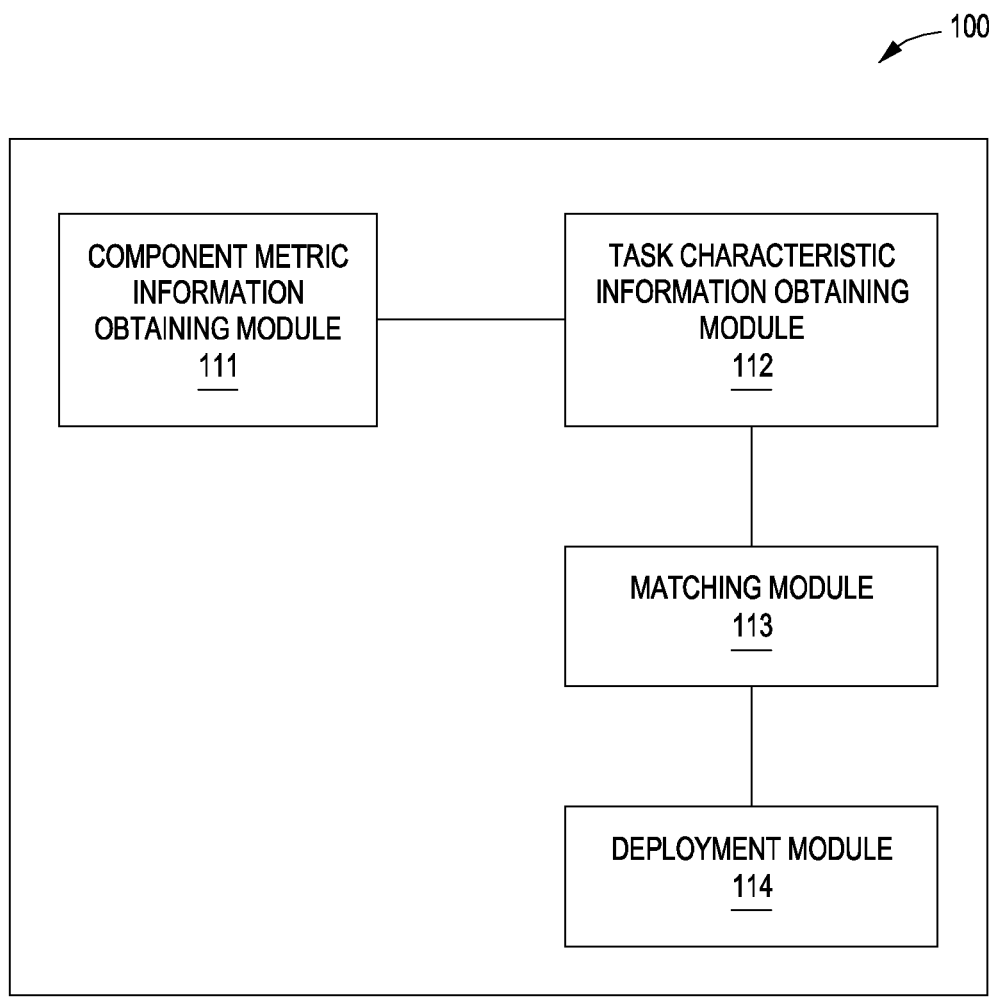
FIG. 1 is a block diagram of an exemplary provisioning apparatus for resource provisioning in accordance with an embodiment of the present disclosure.

Referring to FIG. 1, a block diagram of an exemplary provisioning apparatus in accordance with embodiments of the present disclosure is shown. The provisioning apparatus 100 includes a component metric information obtaining module 111, a task characteristic information obtaining 112, a matching module 113 and a deployment module 114. In particular, the component metric information obtaining module 111 is configured to obtain metric information concerning node resource components of a pool of processing nodes managed by the provisioning apparatus and having information meeting the resource requirements for executing a target task in a computing environment. The task characteristic information obtaining module 112 is configured to obtain performance characteristics of a target task executing on a first set of one or more processing nodes selected from the pool of the processing nodes. The matching module 113 is configured to determine a second set of one or more processing nodes which satisfy the resource requirements matching the target task based on the node component metric information of the processing nodes in the pool of processing nodes and the obtained task characteristics. The deployment module 114 is configured to deploy the target task to the determined second set of processing nodes in the pool.

It is appreciated by one of ordinary skill of the art that, the pool of processing nodes, the first set of processing nodes and the second set of processing nodes refer to designated processing nodes. For example, the pool of processing nodes can include one or more processing nodes, the first set of processing nodes and the second set of processing nodes can be a sub-set of the pool of processing nodes, respectively. Further, it is also appreciated that the first set of processing nodes and the second set of processing nodes can include the same, different, or partially the same processing nodes in the pool. For example, when the first set of processing nodes are determined as the most suitable nodes for executing a target task that is already running on the first set of processing nodes, the first set of processing nodes is the second set of processing nodes. However, when there are one or more processing nodes that are not part of the first set of processing nodes but more suitable for executing a target task already running on the first set of processing nodes, those one or more other processing nodes are determined by the provisioning apparatus as being the second set of processing nodes, where the first set of processing nodes are entirely different or partially different than the second set of processing nodes.

In particular, the node component metric information obtaining module 111 is configured to obtain the component metric information for the processing nodes in the pool of the nodes managed by the provisioning apparatus 100 and satisfying the node resource requirements for executing a target task. Node resources can include one or more software, hardware and network resources such as, for example, one or more physical or virtual machines with a complete set of hardware having at least a set of CPU resources, memory, storage, network resources, etc. for executing a target task. Component metric information includes, but is not limited to, metrics of the hardware, software, and network related functionalities. For example, such metrics can include CPU capacity, memory bandwidth, storage I/O speed and bandwidth, network bandwidth, etc.

Multiple approaches can be implemented to obtain component metric information of the processing nodes in the pool. For example, a backend operating framework can collect and store component metric information for all the processing nodes during their task execution. Or, at corresponding processing nodes, a monitoring module can be installed to monitor the status and to perform statistics over the monitored status data to obtain component metric information. Alternatively, a daemon program can be installed at all the processing nodes to measure and to obtain the component metrics thereof in a periodic manner. Finally, the obtained metric information is transmitted by the backend operating framework or by the monitoring module or by the daemon program to the provisioning apparatus. By obtaining component metric information of the pool of the processing nodes, the status of the usage and the availability of the resources on the processing nodes capable of executing a target task can be better determined, thereby contributing to a higher degree of accuracy and speed of resource provisioning.

Further, the task characteristics obtaining module 112 is configured to obtain the task characteristic information for a target task executing on the one or more processing nodes in the first set of processing nodes. The first set of processing nodes refers to the set of processing nodes that are managed by the provisioning apparatus and are currently executing the target task. The target task is the task that is currently running on one or more of the processing nodes managed by the provisioning apparatus. The node resource requirements by the target task during its execution on the corresponding nodes are the task characteristics of the target task. Task characteristics include, for example, CPU capability, memory bandwidth, storage I/O speed and bandwidth, network bandwidth, etc.

Multiple approaches can be implemented to obtain task characteristic information of a target task. For example, a backend operating framework can collect and compute the corresponding task characteristic information of the target task during all the processing nodes' execution of the task. Or, at corresponding processing nodes, a monitoring module can be installed to monitor the execution status and to perform statistics over the monitored status data to obtain the task characteristic information. Alternatively, a daemon program can be installed at the processing nodes executing the target task to measure the execution status periodically and to analyze and obtain the task characteristics of the target task over a period of time. Finally, the obtained task characteristics are transmitted by the backend operating framework or by the first set of processing nodes (e.g., the monitoring module or the daemon program running on the first set of processing nodes) to the provisioning apparatus. By obtaining the task characteristics of the target task running on the first set of processing nodes, resource requirements such as the requirements of the hardware and network resources of the target task can be better determined, thereby contributing to a higher degree of accuracy and speed of resource provisioning.

Further, the matching module 113 is configured to determine, based on the obtained task characteristic information of the target task and the obtained component metric information of the pool of processing nodes, a second set of one or more processing nodes from the pool of processing nodes that satisfy the resource requirements of the target task. Given the obtained component metric information indicating the resource metric profile of all the processing nodes managed by the provisioning apparatus and suitable for executing the target task, and given the obtained task characteristics indicating the resource requirements by the target task, the matching of the component metric information of the pool of the processing nodes with the task characteristics of the target task advantageously allows for the selection of one or more processing nodes that are best suitable for executing the target task. The target task is deployed to one or more of the selected one or more processing nodes for continuous execution; those one or more processing nodes executing the target task become the second set of processing nodes.

Multiple approaches can be implemented to determine a second set of processing nodes. For example, relative ratios of the obtained task characteristic and the obtained corresponding component metric of all the processing nodes in the pool are computed. Based on the computed relative ratios, ranked lists are generated to determine a highest ratio, a second highest ratio, etc., in terms of the demand level of resource requirements by the target task. Next, the second set of processing nodes is determined based on the above described ranked lists. With the determination of the second set of processing nodes matching the task characteristics of the target task from the pool of processing nodes, the matching and provisioning of resources can become more reasonable. This effectively avoids the situation where the execution of the target task is delayed because of the most demanding resource requirements not being met, and at the same time avoids resource waste because of over-provisioning of other less demanding resource requirements of the target task, thereby contributing to a higher rate of resource usage.

Further, referring to FIG. 1, the deployment module 114 is configured to deploy the target task to the determined second set of processing nodes for continuous execution. After a second set of processing nodes of the pool is determined by matching the component metric information of the processing nodes in the pool with the target task's characteristic information, the provisioning apparatus deploys the target task running on the first set of processing nodes to the determined second set of processing nodes for execution. However, in some cases, those processing nodes determined as best matching the resource requirements for executing the target task are still those nodes in the first set of processing nodes. At this point, it is not necessary to deploy the target task to any other processing nodes, as a result of which the target task continues to execute on the first set of processing node. The deployment of the target task to a second set of processing nodes allows for more reasonable resource usage through resource provisioning, thereby increasing the execution speed of tasks, maximizing resource usage rate, and decreasing power consumption associated with task execution.

In some embodiments, the determined second set of processing nodes that best match the target task resource requirements satisfies at least one of the following conditions. First, the component metric information of the processing nodes in the second set exceeds the task characteristic information of the target task. Second, the metric information of the corresponding components of the processing nodes in the second set exceeds the critical characteristics corresponding to the task characteristic information of the target task; and compared to the other processing nodes in the pool, the metric information of the other components of the processing nodes in the second set exceeds and most approximates the other corresponding task characteristics of the target task. Third, the metric information of the corresponding components of the processing nodes in the second set exceeds the critical characteristics corresponding to the task characteristic information of the target task; and compared to the other processing nodes in the pool, the overall metric information of the other components of the processing nodes in the second set exceeds and most approximates the overall other corresponding task characteristics of the target task.

In particular, when the above described first condition is utilized to determine the second set of processing nodes, the obtained component metric information of the proceeding nodes in the pool is compared to the obtained task characteristic information of the target task upon matching of target task with processing nodes by the provisioning apparatus. All the processing nodes in the pool having the component metric information that exceeds the task characteristic information are selected. For example, processing nodes which have maximum metric information (of each component exceeding an average of each corresponding task characteristic information) are selected from the pool of processing nodes, out of which one or more processing nodes are determined as the second set of processing nodes.

Further, when the above described second condition is utilized to determine the second set of processing nodes, the critical characteristics of the task characteristic information are satisfied in priority level with the obtained component metric information of the processing nodes in the pool during the matching target task to processing nodes by the provisioning apparatus. Critical characteristics refer to one or more most demanding resource requirements by the target task for the components. For example, relative ratios of the task characteristics corresponding to the metric information for each component of the processing nodes are ranked in a descending order, based on which the corresponding processing nodes are selected. In other words, those processing nodes satisfying the most demanding critical characteristics are selected to generate a first candidate set of processing nodes, from which the processing nodes satisfying the second most demanding critical characteristics and at the same time satisfying the most demanding characteristic in a minimal degree are selected to generate a second candidate set of processing nodes. From the second candidate set of processing nodes, those satisfy the third demanding characteristic and at the same time satisfy the second most demanding characteristic in a minimal degree are selected to generate the third candidate set of processing nodes, and so forth until a final set of processing nodes are generated to best satisfy the task characteristics of the target task.

In an example where a target task has the critical characteristic as the requirement for storage I/O bandwidth, the second critical characteristic as the requirement for memory bandwidth, the third characteristic as the requirement for CPU capacity and the lowest characteristics as the requirement for the network bandwidth, the provisioning apparatus selects from its managed pool of processing nodes all the processing nodes that satisfy the storage I/O bandwidth requirement to generate a first candidate set of processing nodes. Then, the provisioning apparatus selects from the first candidate set the processing nodes that satisfy the memory bandwidth requirement and at the same time have a lowest amount of storage I/O bandwidth to generate a second candidate set of processing nodes. Next, the provisioning apparatus selects from the second candidate set processing nodes that satisfy the CPU requirement and at the same time have the lowest amount of memory bandwidth to generate a third candidate set of processing nodes. Finally, the provisioning apparatus selects from the third candidate set processing nodes that satisfy the requirement of network bandwidth and at the same time have the lowest amount of CPU capacity to generate a final set of processing nodes. When more than one processing nodes are included in the final set of processing nodes, the provisioning apparatus can, for example, randomly select one or more processing nodes, e.g., the second set of processing nodes, from the final set and deploy the target task to the second set of the processing nodes. With this selection of the second set of processing nodes, not only the relatively most demanding critical resource requirements for storage I/O bandwidth and memory bandwidth are satisfied with priority, but also the resources of less demanded CPU and network bandwidth are not wasted, ensuring fast execution of the target task, thereby increasing overall resource usage rate, and decreasing power consumption associated with the execution of the task.

Further, when the above described third condition is utilized to determine the second set of processing nodes, the critical characteristics of the task characteristic information are satisfied in priority by the obtained component metric information of the processing nodes, and the remaining task characteristics are satisfied with the overall component metric information that exceeds and most approximates the overall task characteristics corresponding to the task characteristic information of the target task, upon the matching of the target task with processing nodes by the provisioning apparatus. Critical characteristics are the one or more task characteristics that mostly constrain the execution speed of a target task. First, all the critical characteristics are satisfied for the execution of the target task. For example, with a target task having critical characteristics as the requirements for CPU capacity and memory bandwidth, all the processing nodes that have a maximum CPU capacity and a maximum memory bandwidth exceeding the respective requirements are selected from the pool of the processing nodes to generate a candidate set of processing nodes. Next, the remaining component metric information is compared with the remaining task characteristic information of the target task to select all the processing nodes having the remaining component metric information that exceeds the remaining corresponding task characteristic information from the candidate set of processing nodes. For example, all the processing nodes that have a maximum metric information for each remaining component exceeding an average characteristic of the corresponding remaining task characteristic information are selected from the candidate set to generate a second candidate set. Next, for each processing nodes in the second candidate set, the difference between a maximum of metric information and the respective average task characteristic information is computed for each remaining task characteristic, the result of which is utilized to generate an average of all the computed difference for each processing node in the second candidate set. Next, the averages for all the processing nodes in the second candidate set are ranked to determine one or more processing nodes having a minimum computed difference average. The determined one or more processing nodes generate the second set of processing nodes.

In some other embodiments, the provisioning apparatus 100 further includes a critical characteristic determination module (not shown). The critical characteristic determination module is configured to determine the critical task characteristics corresponding to the task characteristic information of the target task, based on the obtained task characteristic information and the obtained component metric information of the processing nodes in the pool. Critical characteristics indicate the one or more most demanding resource requirements by the target task for a processing node. For example, a target task can have a most demanding requirement for memory bandwidth, without this requirement being satisfied, the execution speed of the target task is hindered and delayed, even when the target task is running on a processing node having a large CPU capacity. In this case, the memory bandwidth is a critical characteristic of the target task.

One exemplary approach to determine critical characteristics for a target task is to compute a relative ratio of each task characteristic and respective component metric information corresponding to all the processing nodes in the pool of processing nodes. In particular, an average of each task characteristic during a period of time can be computed by analyzing each task characteristic of the target task. For example, during a period of time, an average of CPU usage of CPUtask, an average of memory bandwidth usage MEMtask, an average of storage I/O speed IOPStask, an average of storage I/O bandwidth usage IOtask, and an average of network bandwidth usage NETtask can be obtained for a target task. Next, the maximum values of the component metric information of all the processing nodes in the pool managed by the provisioning apparatus are ranked for each component respectively to obtain a maximum value and a minimum value for each component. For example, with a provisioning apparatus managing 5 processing nodes, a maximum CPU capacity of CPUnode (in the unit of Glops), maximum memory bandwidth MEMnode (in the unit of MB/s), maximum storage I/O speed IOPSnode (in the unit of IOPS), maximum storage I/O bandwidth IOnode (in the unit of MB/s), and maximum network bandwidth NETnode (in the unit of MB/s) are obtained for each of the 5 processing nodes respectively. Each series of the 5 maximum values of the corresponding components are ranked to determine for the 5 processing nodes: a maximum CPU capacity CPUmax and a minimum CPU capacity CPUmin; a maximum memory bandwidth MEMmax and a minimum memory bandwidth MEMmin; a maximum storage I/O speed IOPSmax and a minimum storage I/O speed IOPSmin; a maximum storage I/O bandwidth IOmax and a minimum storage I/O bandwidth IOmin; and a maximum network bandwidth NETmax and a minimum network bandwidth NETmin. Then, relative ratios of the target task's task characteristics and the component metric information corresponding to all the processing nodes in the pool are computed. For example, a relative ratio of CPUscore can be computed with an exemplary formula of CPUscore=(CPUtask−CPUmin)/(CPUmax−CPUmin); a relative ratio of MEMscore can be computed by an exemplary formula of MEMscore=(MEMtask−MEMmin)/(MEMmax−MEMmin); a relative ratio of IOPSscore can be computed by an exemplary formula of IOPSscore=(IOPStask−IOPSmin)/(IOPSmax−IOPSmin); a relative ratio of IOscore can be computed by an exemplary formula of IOscore=(IOtask−IOmin)/(IOmax−IOmin); and a relative ratio of NETscore can be computed by an exemplary formula of NETscore=(NETtask−NETmin)/(NETmax−NETmin). Lastly, threshold values can be configured for those relative ratios. For example, a threshold value can be configured as 0.5, and any task characteristic corresponding to a relative ratio exceeding 0.5 is determined as the critical characteristic. The determination of critical characteristics corresponding to the task characteristic information of a target task allows the determination of the most demanding resource requirements by the target task during the execution for the processing nodes, thereby contributing to a higher degree of effectiveness and accuracy of resource provisioning.

In some other embodiments, the provisioning apparatus 100 can further include a user inquiry receiving module (not shown) and a user inquiry responding module (not shown). The user inquiry receiving module is configured to obtain inquiry requests from users; and the user inquiry responding module is configured to provide the responses to the received user inquiry requests to the user. User inquiry requests refer to requests from the user to inquire about the status of the processing nodes managed by the provisioning apparatus, or the execution status of a target task running on one or more processing nodes managed by the provisioning apparatus. After receiving an inquiry request, the provisioning apparatus responds to the user based on the monitoring data collected regarding the execution of the target task and/or the status of the processing nodes.

In some embodiments, a response to a user inquiry includes at least one of the following: task provisioning information corresponding to the task inquired by the user; task execution information corresponding the task inquired by the user; or node execution status information corresponding to the processing nodes by the user. In particular, an inquired task refers to a task submitted by the user to the provisioning apparatus in a deployment request. Therefore, the user can inquire about all the tasks submitted to the provisioning apparatus under the user's account, regarding information such as, for example, task provisioning information, e.g., information regarding the processing nodes, on which the task has been, currently is, and/or will be deployed, in relation with the task. Similarly, the user can inquire about the present and historical execution status of the task, and the execution status of the corresponding processing nodes.

It is appreciated by one of the ordinary skill in the art that the above described obtaining of component metric information of the pool of processing nodes, the obtaining of task characteristics information of a target task running on a first set of processing nodes, the determination of a second set of processing nodes, and determination of critical characteristics are merely examples, any other suitable and/or well-known methods that already exist or will become available in the future, are within the scope of the present disclosure.

Figure 2:
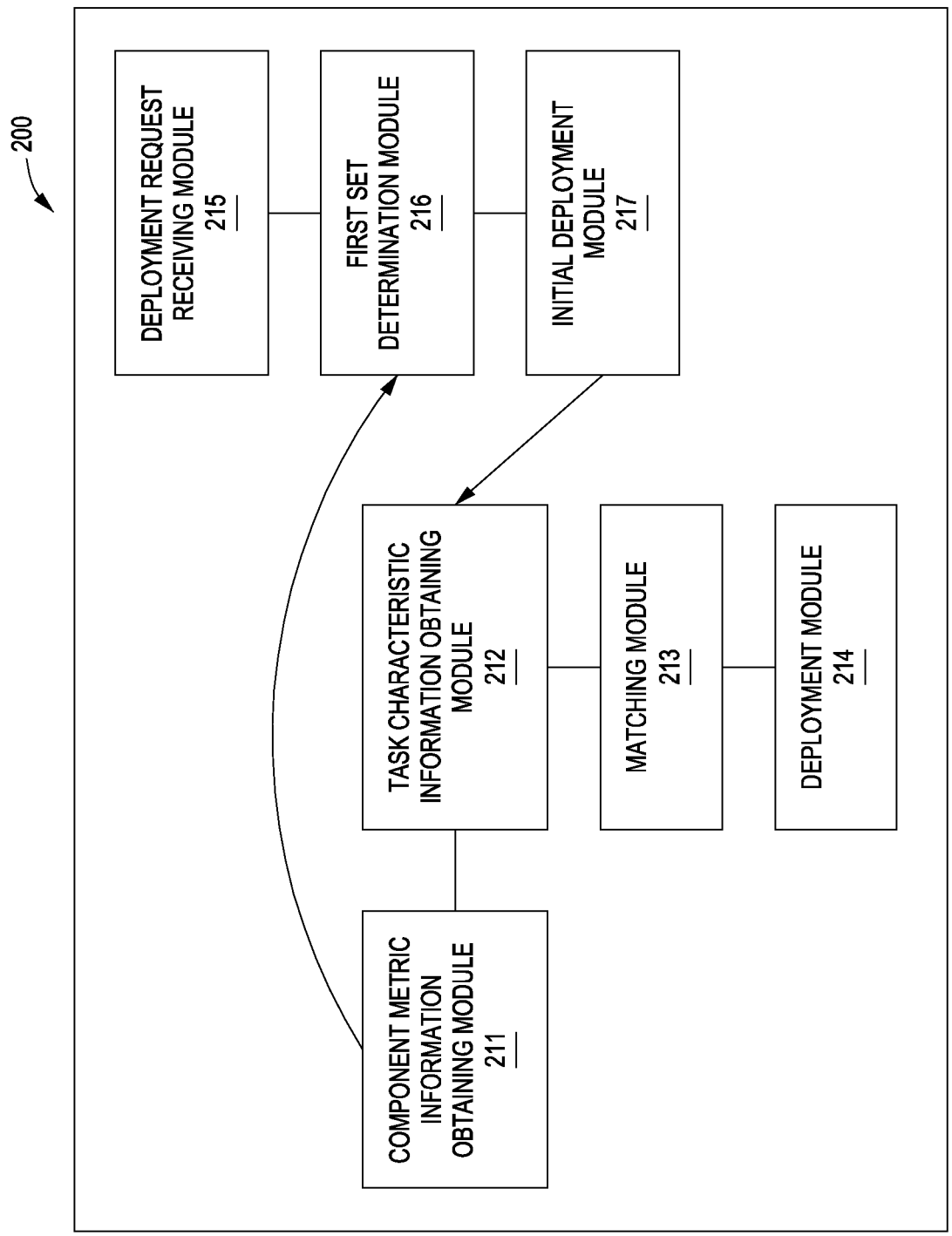
FIG. 2 is a block diagram of another exemplary provisioning apparatus for resource provisioning in accordance with an embodiment of the present disclosure.

Referring to FIG. 2, a block diagram of another exemplary provisioning apparatus in accordance with embodiments of the present disclosure is shown. Provisioning apparatus 200 includes a component metric information obtaining module 211, a task characteristic information obtaining module 212, a matching module 213, a deployment module 214, a target task deployment request receiving module 215, a first set determination module 216 and an initial deployment module 217.

The component metric information obtaining module 211 is configured to obtain component metric information of all the processing nodes in the pool. The target task deployment request receiving module 215 is configured to obtain task deployment requests corresponding to the target task. The first set determination module 216 is configured to determine a first set of processing nodes in the pool of processing nodes managed by the provisioning apparatus 200 based on the component metric information of the pool of processing nodes. The task characteristic information obtaining module 212 is configured to obtain task characteristic information of the target task running on the first set of the processing nodes. The matching module 213 is configured to determine a second set of processing nodes from the pool of processing nodes to match the resource requirements of the target task based on the obtained task characteristic information and the component metric information of the processing nodes in the pool. The deployment module 214 is configured to deploy the target task to the determined second set of processing nodes for execution. The initial deployment module 217 is configured to deploy the target task to the first set of processing nodes for execution.

The component metric information obtaining module 211, the task characteristic information obtaining module 212, the matching module 213 and the deployment module 214 are substantially similar to the corresponding modules of the provisioning apparatus 100 of FIG. 1, and details are not repeated here for the purpose of simplicity.

In particular, the target task deployment request receiving module 215 is configured to receive task deployment requests for a target task. A target task deployment request is sent by a user or other provisioning apparatus to the present provisioning apparatus 200 in order to request deploying of a target task for execution, which task has not been executed on any processing nodes managed by the provisioning apparatus 200, on one or more of the processing nodes managed by the provisioning apparatus 200. In some other embodiments, a target task deployment request can include all the types of requests related to the target task being executed on one or more of the processing nodes managed by the provisioning apparatus 200.

Next, the first set determination module 216 is configured to determine a first set of processing nodes from the pool of the processing nodes managed by the provisioning apparatus 200 to match the resource requirements of the target task based on the component metric information of the pool of the processing nodes. Here, the component metric information of the processing nodes in the pool is obtained by the component metric information obtaining module 211. After receiving a deployment request for a target task, the provisioning apparatus 200 determines one or more processing nodes in the pool that are best suited for executing the target task based on an overall analysis of the component metric information of the pool of processing nodes. The selection of the first set of processing nodes allows for the processing nodes to start analyzing task characteristic information for the target task in execution and avoids lengthy hold-time before the target task is deployed for execution.

In order to provide fast task deployment and to avoid the hardware constraints of the processing nodes causing errors in obtaining task characteristic information for the target task, the component metric information of the processing nodes in the pool is ranked according to an overall capability to select one or more presently idle processing nodes having a best overall capacity as the first set of processing nodes. For example, all the processing nodes are selected from the pool having metric information of each component that exceeds an average metric information of all the presently idle processing nodes in a scale of from about 10 percent to about 30 percent. The selection of the first set of processing nodes from the pool to match the resource requirements of the target task allows the target task to start execution as soon as possible, and avoids delays in deployment and queued up tasks. At the same time, the first set of processing nodes with the target task deployed thereon can start obtaining task characteristic information for the target task, contributing to the determination of the second set of processing nodes, increasing the execution speed of the target task, maximizing resource usage rates and decreasing power consumption associated with the execution of tasks.

Further, the initial deployment module 217 is configured to deploy the target task to the above described first set of processing nodes for execution. By use of analyzing the overall component metric information of the processing nodes in the pool, the processing nodes that allow for a maximum execution speed of the target task and provide minimal constraints by the hardware resources are determined as the first set of processing nodes. The provisioning apparatus 200 deploys the target task to the first set of processing nodes to decrease the wait-time for the target task, and at the same time to allow the processing nodes to start to obtain the task characteristic information of the target task as soon as possible.

It is appreciated by one of the ordinary skill in the art that the above described determination of a first set of processing nodes is merely an example, any other suitable and/or well-known methods that already exist or will become available in the future, are within the scope of the present disclosure.

Figure 3:
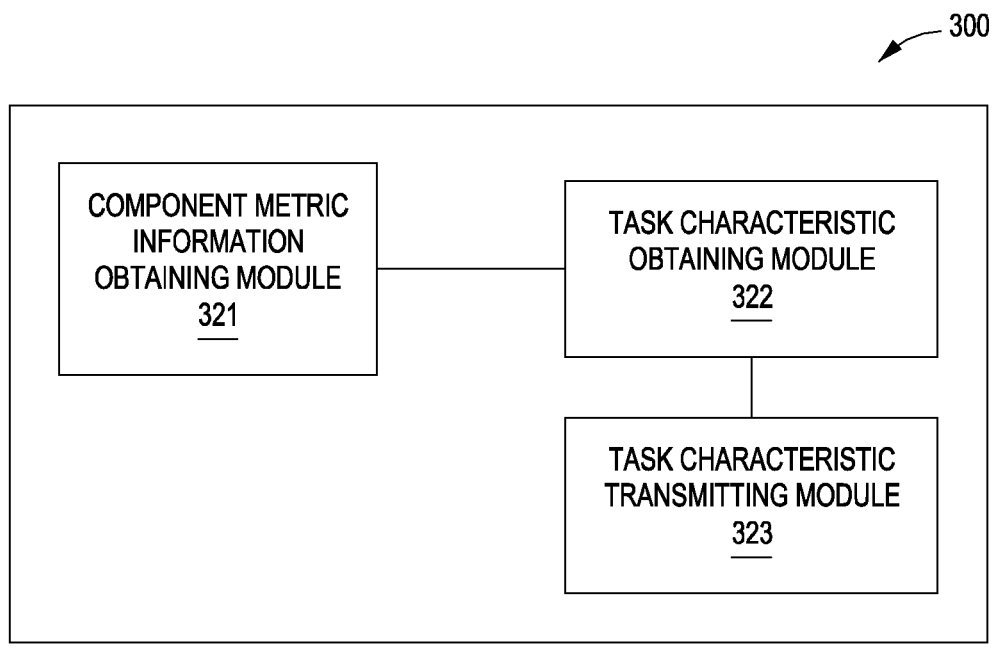
FIG. 3 is a block diagram of an exemplary processing node for resource provisioning in accordance with an embodiment of the present disclosure.

Referring to FIG. 3, a block diagram of an exemplary processing node in accordance with embodiments of the present disclosure is shown. The processing node 300 includes a component metric measuring module 321, a task characteristic obtaining module 322 and a task characteristic transmitting module 323.

The component metric measuring module 321 is configured to measure the metric of the components of the processing node 300 and transmit the measured metric information to the corresponding provisioning apparatus. The task characteristic obtaining module 322 is configured to obtain the task characteristic information for the target task during its execution on the processing node 300. The task characteristic transmitting module 323 is configured to transmit the obtained task characteristic information of the target task to the corresponding provisioning apparatus.

The processing node 300, the components of which the component metric measuring module 321 is configured to measure, is one of the processing nodes managed by the provisioning apparatus. The components measured include, but are not limited to, the hardware and network resources of the processing node 300, such as, for example, a complete set of hardware having at least a set of CPU resource, memory resource, storage resource, network resource, etc. capable of executing a target task. Component metric information includes, but is not limited to, hardware and network related performance information such as, for example, CPU capacity, memory bandwidth, storage I/O speed and bandwidth, network bandwidth, etc. The measuring of component metric information can be implemented by, for example, installing a daemon program on the processing node 300 to periodically measure and collect the component performance data. In some embodiments, the measured component metric information includes a maximum value and minimal value. For example, a maximum value of CPU capacity, $CPU_{node}$, in the unit of Gflops, a maximum value of memory bandwidth, $MEM_{node}$, in the unit of MB/s, a maximum value of storage I/O speed, $IOPS_{node}$, in the unit of IOPS, a maximum value of storage I/O bandwidth, $IO_{node}$, in the unit of MB/s, a maximum value of network bandwidth, $NET_{node}$, in the unit of MB/s, etc. The measured component metric information is transmitted from the processing node 300 to the provisioning apparatus such that, during the resource provisioning, the status of all the processing nodes can be more accurately identified, contributing to more effective resource provisioning.

Next, the task characteristic obtaining module 322 is configured to, during the execution of the target task, obtain the task characteristic information for the target task. Here, the target task refers to a task that is being executed by the present processing node. Task characteristics include, for example, CPU capability, memory bandwidth, storage I/O speed and bandwidth, network bandwidth, etc. Multiple approaches can be implemented to obtain task characteristic information of a target task. For example, a backend operating framework can collect and compute the corresponding task characteristic information of the target task during the processing node's execution of the task. Alternatively, at corresponding processing nodes, a monitoring module can be installed to monitor the execution status and to perform statistics over the monitored status to obtain the task characteristic information. Alternatively, a daemon program can be installed at the processing node executing the target task to measure the execution status periodically and to analyze to obtain the task characteristics of the target task over a period of time. Finally, the obtained task characteristics are transmitted by the processing node to the provisioning apparatus. With the obtained task characteristics of the target task running on the processing node, the resource requirements such as the requirements for the hardware and network resources by the target task can be better determined, thereby contributing to the higher degree of accuracy and speed of resource provisioning.

Next, the task characteristic transmitting module 323 is configured to transmit the task characteristic information to the provisioning apparatus. Here, the provisioning apparatus refers to the provisioning apparatus which manages the processing node on which the target task is running. The method of transmitting to the provisioning apparatus can be, for example, by use of the system that includes both the provisioning apparatus and the processing node. With the transmitting of the task characteristic information to the provisioning apparatus, the provisioning apparatus can better identity the task characteristics to more reasonable match the resources for the target task, thereby ensuring the provisioned processing nodes satisfy the resource requirements of the target task and at the same time avoiding wasting node resources because of over-provisioning.

Further, the processing node 300 can further include an executing module (not shown), configured to execute the target task deployed by the provisioning apparatus to the processing node. Here, the target task deployed by the provisioning apparatus to the processing node includes a target task which is deployed to the processing node managed by the provisioning apparatus and the analysis of the task characteristics of which is started for the first time. The target task also includes a task, which, after its task characteristic have already been analyzed, is to be executed after matching the resource nodes and the target task. Also, the processing nodes, on which the target task is executed for the first time or is executed after matching the resource nodes with the target task, can be the same or different processing nodes. Since a processing node which executes the target task for the first time, e.g., a processing node in the first set, can be selected as one of the processing nodes in the second set upon a match, such processing node has a possibility of being selected as the processing node best suitable for executing the target task as well. In this scenario, the target task does not need to be deployed a second time to another processing node.

In some other embodiments, the processing node 300 further includes a critical characteristic information determination module (not shown), configured to determine the critical task characteristics corresponding to the target task's characteristic information based on the task characteristic information and the component metric information of the pool of processing nodes. When the task characteristic information transmitting module transmits the task characteristic information to the provisioning apparatus, the critical task characteristics are included therein.

After the component metric information of the first set of processing nodes is collected by each processing node in the pool and transmitted to the provisioning apparatus, the provisioning apparatus transmits to each processing node in the pool the component metric information of the other processing nodes in the pool. Therefore, each of the processing nodes in the pool has the component metric information of the other processing nodes in the pool and managed by the same provisioning apparatus. Critical characteristics indicate the one or more most demanding resource requirements by the target task for a processing node. For example, a target task can have a most demanding requirement for memory bandwidth, and without which being satisfied, the execution speed of the target task is hindered and delayed, even when the target task is running on a processing node having a large CPU capacity. In this case, the memory bandwidth is a critical characteristic of the target task.

One exemplary approach to determine critical characteristics for a target task includes computing a relative ratio of each task characteristic and respective component metric information corresponding to all the processing nodes in the pool of processing nodes. Such relative ratio indicates to a certain degree the demand level for a resource requirement by the target task. In particular, an average of each task characteristic during a period of time can be computed by analyzing each task characteristics of the target task. For example, during a period of time, an average of CPU usage of CPUtask, an average of memory bandwidth usage MEMtask, an average of storage I/O speed IOPStask, an average of storage I/O bandwidth usage IOtask, and an average of network bandwidth usage NETtask can be obtained for a target task. Next, the maximum values of the component metric information of all the processing nodes in the pool managed by the provisioning apparatus are ranked for each component respectively to obtain a maximum value and a minimum value for each component. For example, with a provisioning apparatus managing 5 processing nodes, a maximum CPU capacity of CPUnode (in the unit of Glops), maximum memory bandwidth of MEMnode (in the unit of MB/s), maximum storage I/O speed of IOPSnode (in the unit of IOPS), maximum storage I/O bandwidth of IOnode (in the unit of MB/s), and maximum network bandwidth of NETnode (in the unit of MB/s) are obtained for each of the 5 processing nodes respectively. Each series of the 5 maximum values of the corresponding components are ranked to determine for the 5 processing nodes, a maximum CPU capacity, CPUmax, and a minimum CPU capacity, CPUmin, a maximum memory bandwidth, MEMmax, and a minimum memory bandwidth, MEMmin, a maximum storage I/O speed, IOPSmax, and a minimum storage I/O speed, IOPSmin, a maximum storage I/O bandwidth, IOmax, and a minimum storage I/O bandwidth, IOmin, and a maximum network bandwidth, NETmax and a minimum network bandwidth, NETmin.

Then, relative ratios of the target task's task characteristics and the component metric information corresponding to all the processing nodes in the pool are computed. For example, a relative ratio of CPUscore can be computed with an exemplary formula of CPUscore=(CPUtask−CPUmin)/(CPUmax−CPUmin); a relative ratio of MEMscore can be computed by an exemplary formula of MEMscore=(MEMtask−MEMmin)/(MEMmax−MEMmin); a relative ratio of IOPSscore can be computed by an exemplary formula of IOPSscore=(IOPStask−IOPSmin)/(IOPSmax−IOPSmin); a relative ratio of IOscore can be computed by an exemplary formula of IOscore=(IOtask−IOmin)/(IOmax−IOmin); and a relative ratio of NETscore can be computed by an exemplary formula of NETscore=(NETtask−NETmin)/(NETmax−NETmin). Lastly, threshold values can be configured for those relative ratios. For example, an exemplary threshold value can be configured as 0.5, and any task characteristic corresponding to a relative ratio exceeding 0.5 is determined as the critical characteristic. After determining the critical characteristics corresponding to the task characteristic information of a target task, the critical characteristics are transmitted by the processing nodes that determine such critical characteristics to the provisioning apparatus, thereby allowing the provisioning apparatus to accurately identify the most demanding resource requirements by the target task for a processing node to obtain a higher degree of effectiveness and accuracy of resource provisioning.

In some embodiments, the processing node 300 further includes a triggering module (not shown), configured to detect whether the triggering conditions are met for the purpose of transmitting the collected task characteristics to the provisioning apparatus. With the triggering module, the task characteristic information transmitting module transmits to the provisioning apparatus when the triggering module detects the triggering conditions being affirmatively met. When a target task executes on one of the processing nodes managed by the provisioning apparatus and starts to collect task characteristic information for the first time, there might be instances where the target task halts its execution during information collecting, or the hardware of the processing node malfunctions, resulting in collection of inaccurate task characteristic information. Therefore, it is necessary to configure a condition to trigger the transmitting of task characteristic information to the provisioning apparatus to avoid the above described error situation and to increase the system reliability.

In some embodiments, a triggering condition includes at least one of the following: the task characteristic collecting duration of time corresponding to the task character information exceeding a pre-configured threshold; the execution duration of the target task on the processing node exceeding a pre-configured threshold execution time duration. Here, the use of a pre-configured threshold collecting time duration can prevent the transmitting of inaccurate task characteristic information to the provisioning apparatus when the hardware of the processing node executing the target task malfunctions and pauses the collection of the task characteristic information. In other words, when the collecting duration exceeds the pre-configured threshold time duration, the collected task characteristic information will not be transmitted to the provisioning apparatus. Similarly, the use of a pre-configured threshold execution time duration also prevents the transmitting of inaccurate task characteristic information to the provisioning apparatus when the target task halts its execution due to its own programming defect and causes the collection of inaccurate task characteristic information. When the target task execution duration exceeds the pre-configured threshold execution duration, the collected task characteristic information will not be transmitted to the provisioning apparatus either. The use of those thresholds to trigger the transmitting of the task characteristic information can increase the accuracy of the task characteristic information provided by the processing nodes.

It is appreciated by one of the ordinary skill in the art that the above described obtaining of task characteristic information, determination of the critical task characteristic information, and detecting of the triggering conditions are merely examples, any other suitable and/or well-known methods that already exist or will become available in the future, are within the scope of the present disclosure.

Figure 4:
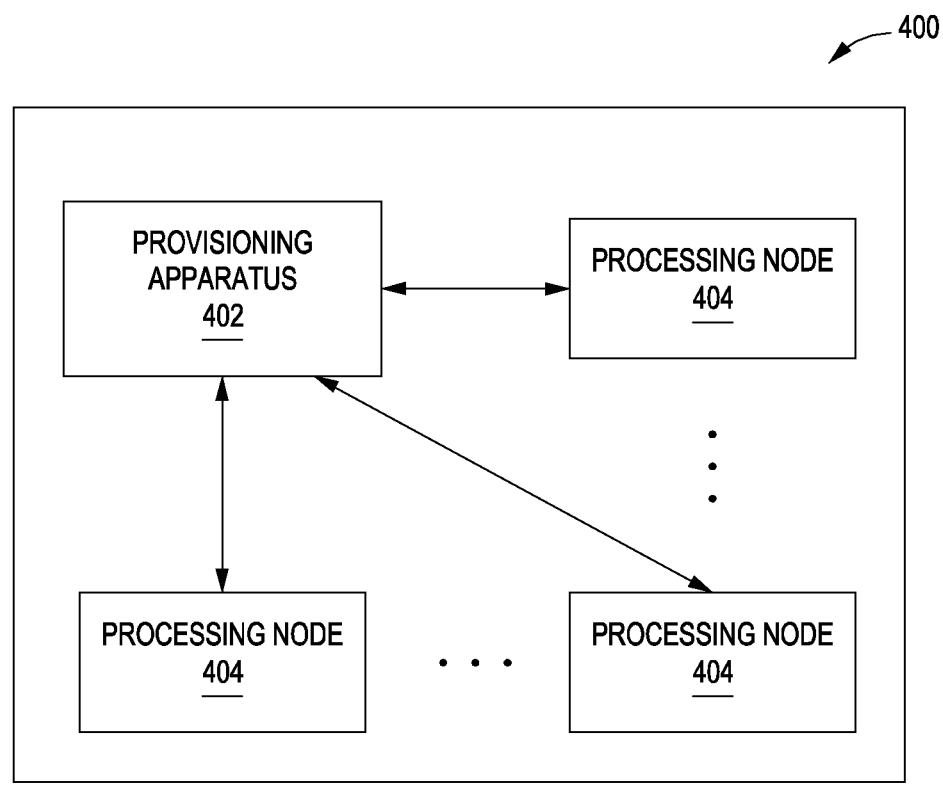
FIG. 4 is a block diagram of an exemplary system of a provisioning apparatus for resource provisioning and processing nodes for resource provisioning in accordance with an embodiment of the present disclosure.

Referring to FIG. 4, a block diagram of an exemplary system including a provisioning apparatus and a plurality of processing nodes in accordance with embodiments of the present disclosure is shown. The system 400 includes a provisioning apparatus 402 and a plurality of processing nodes 404 managed thereby. In particular, a component metric information measuring module of the processing node 404 measures the component metrics of the processing nodes and provides the collected component metric information of the processing node to the provisioning apparatus 402. The component metric information obtaining module of the provisioning apparatus 402 obtains the component metric information of a pool of the processing nodes 404. The processing nodes in the pool all suitable for executing the target task. The task characteristic information obtaining module of the processing node 404 obtains the task characteristic information of the target task during its execution. The task characteristic information transmitting module of the processing node 404 transmits the obtained characteristic information of the target task to the provisioning apparatus 402. The task characteristic information obtaining module of the provisioning apparatus 402 obtains task characteristic information of a target task executed on the first set of processing nodes. The matching module of the provisioning apparatus 402 determines a second set of processing nodes out of the pool of the processing nodes that matches the target task resource requirement based on the obtained task characteristic information and the component metric information of the processing nodes in the pool.

The deployment module of the provisioning apparatus 402 deploys the target task to the determined second set of processing nodes. The details of the provisioning apparatus 402 are substantially similar to the provisioning apparatus 100 of FIG. 1 and the provisioning apparatus 200 of FIG. 2, and the details of the processing nodes 404 are substantially similar to the processing node 300 of FIG. 3. These details are not repeated here for the purpose of simplicity. Alternatively, the system 400 can further include a user node (not shown), from which the user of the system communicates with the provisioning apparatus 402 to request deployment of a target task, to inquire about the execution status of a submitted task, or to inquire about the status of one or processing nodes 404 managed by the provisioning apparatus 402.

Figure 5:
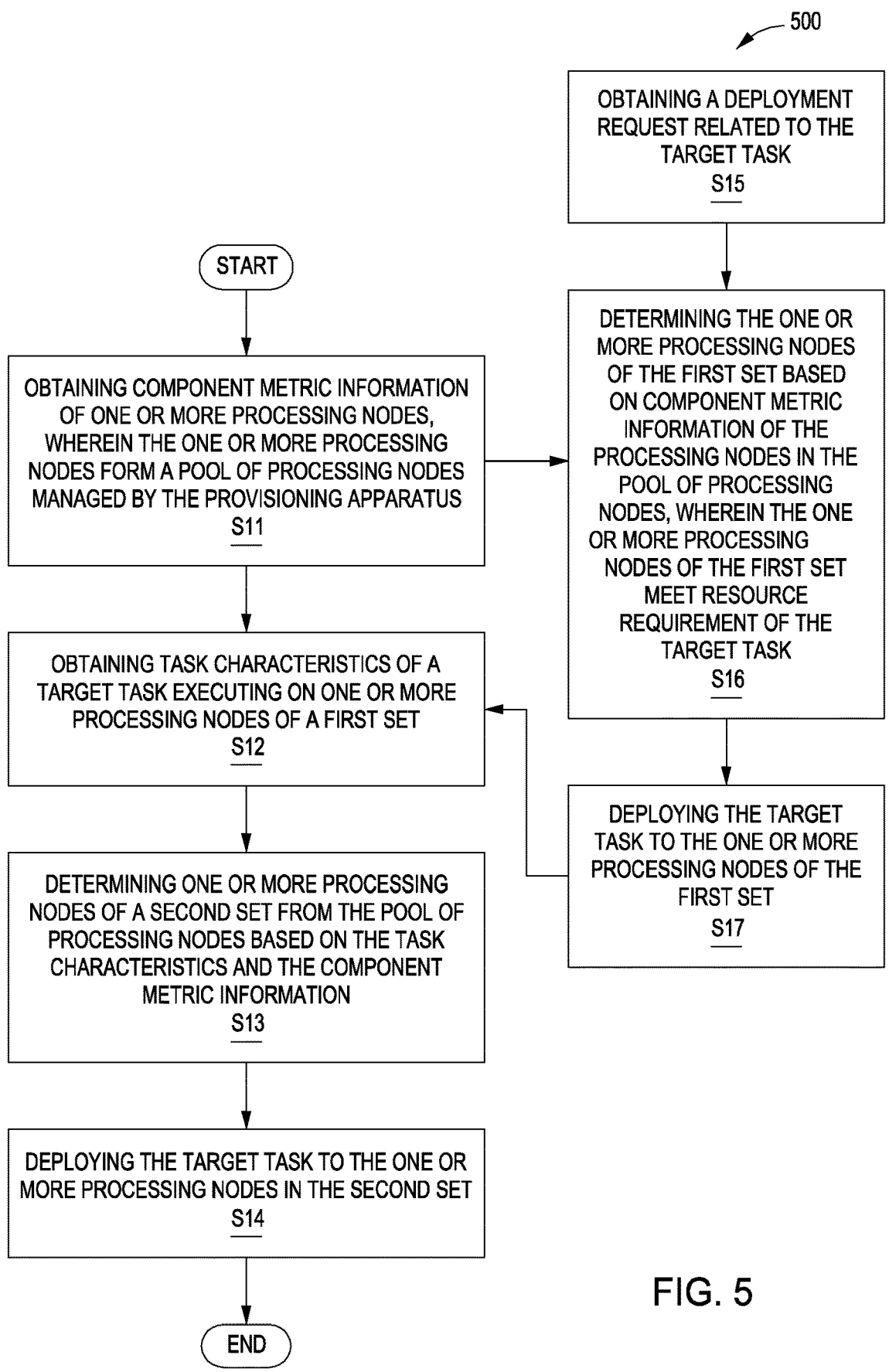
FIG. 5 is a flow chart of an exemplary computer implemented method of resource provisioning by a provisioning apparatus in accordance with an embodiment of the present disclosure.

Referring to FIG. 5, a flow chart of an exemplary method of resource provisioning by a provisioning apparatus in accordance with embodiments of the present disclosure is shown. The method 500 starts in step S11, where the provisioning apparatus obtains component metric information of the processing nodes in the pool. In step S12, the provisioning apparatus obtains task characteristic information for a target task running on one or more processing nodes in a first set of processing nodes. In step S13, the provisioning apparatus determines a second set of processing nodes that match the resource requirements by the target task from the pool of the processing nodes, based on the target task characteristic information and the component metric information of the pool of processing nodes. In step S14, the provision apparatus deploys the target task to the determined second set of processing nodes.

It is appreciated by ones with ordinary skill of the art in the field that, the pool of processing nodes, the first set of processing nodes and the second set of processing nodes refer to designated execution nodes. For example, the pool of processing nodes can include one or more execution nodes, the first set of processing nodes and the second set of processing nodes can be a sub-set of the pool of processing nodes, respectively. Further, it is also appreciated by ones with ordinary skill of the art in the field that the first set of processing nodes and the second set of processing nodes can include the same, different, or partially same processing nodes in the pool. For example, when the first set of processing nodes are determined as the most suitable nodes for executing a target task that is already running on the first set of processing nodes, the first set of processing nodes is the second set of processing nodes. However, when there are one or more processing nodes that are not part of the first set of processing nodes but more suitable for executing a target task already running on the first set of processing node, those one or more other processing nodes are determined by the provisioning apparatus as being the second set of processing nodes, where the first set of processing nodes are entirely different or partially different than the second set of processing nodes.

In particular, the pool of processing nodes for which component metric information is obtained in step S11 are the processing nodes managed by the provisioning apparatus and meeting the node resource requirements for executing a target task. Node resources can include one or more hardware and network resources such as, for example, one or more physical or virtual machines with a complete set of hardware having at least a set of CPU resources, memory resources, storage resources, network resources, etc. for executing a target task. Component metric information includes, but is not limited to, metrics of the hardware, software, and network related functionalities. For example, such metrics can be the CPU capacity, memory bandwidth, storage I/O speed and bandwidth, network bandwidth, etc.

Multiple approaches can be implemented to obtain component metric information of the processing nodes in the pool. For example, a backend operating framework can collect and store component metric information for all the processing nodes during their execution of tasks. Alternatively, at corresponding processing nodes, a monitoring module can be installed to monitor the status and to perform statistics over the monitored data to obtain component metric information. Alternatively, a daemon program can be installed at all the processing nodes to measure and to obtain the component metrics thereof in a periodical manner. Finally, the obtained metric information is transmitted by the backend operating framework or the monitoring module or the daemon program to the provisioning apparatus. By obtaining component metric information of the pool of the processing nodes, the status of the usage and availability of the resources on the processing nodes capable of executing a target task can be better determined, contributing to the higher degree of accuracy and speed of resource provisioning.

Further, the first set of processing nodes running the target task whose task characteristics are obtained in step S12 are the set of one or more processing nodes managed by the provisioning apparatus and currently executing the target task. The target task is the task that is currently running on one or more of the processing nodes managed by the provisioning apparatus. The node resource requirements by the target task during its execution on the corresponding nodes are the task characteristics of the target task. Task characteristics include, for example, CPU capability, memory bandwidth, storage I/O speed and bandwidth, network bandwidth, etc.

Multiple approaches can be implemented to obtain task characteristic information of a target task. For example, a backend operating framework can collect and compute the corresponding task characteristic information of the target task during all the processing nodes' execution of the task. Alternatively, at corresponding processing nodes, a monitoring module can be installed to monitor the execution status and to perform statistics over the monitored status to obtain the task characteristic information. Alternatively, a daemon program can be installed at the processing nodes executing the target task to measure the execution status periodically and to analyze to obtain the task characteristics of the target task over a period of time. Finally, the obtained task characteristics are transmitted by the backend operating framework or the first set of processing nodes (e.g., the monitoring module or the daemon program running on the first set of processing nodes) to the provisioning apparatus. By obtaining the task characteristics of the target task running on the first set of processing nodes, the resource requirements such as the requirements for the hardware and network resources by the target task can be better determined, contributing to the higher degree of accuracy and speed of resource provisioning.

Further, in step S13, a second set of one or more processing nodes from the pool of processing nodes to match the resource requirements of the target task is determined, based on the obtained task characteristic information of the target task and the obtained component metric information of the pool of processing node. With the obtained component metric information indicating the resource metric profile of all the processing nodes managed by the provisioning apparatus and suitable for executing the target task, and the obtained task characteristics indicating the resource requirements by the target task, matching the component metric information of the pool of the processing nodes with the task characteristics of the target task allows for the selection of one or more processing nodes best suitable for executing the target task. The target task is deployed to one or more of the selected one or more processing nodes for continuous execution, those one or more processing nodes executing the target task become the second set of processing nodes.

Multiple approaches can be implemented to determine a second set of processing nodes. For example, relative ratios of the obtained task characteristic and the obtained corresponding component metric of all the processing nodes in the pool are computed. Based on the computed relative ratios, ranked lists are generated to determine a highest ratio, a second highest ratio, etc. in terms of the demandingness of resource requirements by the target task. Next, the second set of processing nodes is determined based on the above described ranked lists. With the determination of the second set of processing nodes matching the task characteristics of the target task from the pool of processing nodes, resource matching and provisioning can become more effective, avoiding the situation where the execution of the target task is delayed because of the most demanding resource requirements not being met, and at the same time avoiding resource waste because of over-provisioning of other less demanding resource requirements of the target task, thereby contributing to a higher degree of resource usage.

In step S14, the target task is deployed to the determined second set of processing nodes for continuous execution. After a second set of processing nodes of the pool is determined by matching the component metric information of the processing nodes in the pool with the target task's characteristic information, the provisioning apparatus deploys the target task running on the first set of processing nodes to the determined second set of processing nodes for execution. However, in some cases, those processing nodes determined as best matching the resource requirements for executing the target task are still those nodes in the first set of processing nodes. At this point, it is not necessary to deploy the target task to any other processing nodes, as a result of which the target task continues to execute on the first set of processing node. The deployment of the target task to a second set of processing nodes allows for more effective resource usage through the resource provisioning, thereby increasing the execution speed of tasks, maximizing the resource usage rate, and decreasing power consumption associated with task execution.

In some embodiments, the determined second set of processing nodes that best match the target task resource requirements satisfies at least one of the following conditions. First, the component metric information of the processing nodes in the second set exceeds the task characteristic information of the target task. Second, the metric information of the corresponding components of the processing nodes in the second set exceeds the critical characteristics corresponding to the task characteristic information of the target task; and compared to the other processing nodes in the pool, the metric information of the other components of the processing nodes in the second set exceeds and most approximates the other corresponding task characteristics of the target task. Thirdly, the metric information of the corresponding components of the processing nodes in the second set exceeds the critical characteristics corresponding to the task characteristic information of the target task; and compared to the other processing nodes in the pool, the overall metric information of the other components of the processing nodes in the second set exceeds and most approximates the overall other corresponding task characteristics of the target task.

In particular, when the above described first condition is utilized to determine the second set of processing nodes, the obtained component metric information of the proceeding nodes in the pool is compared to the obtained task characteristic information of the target task upon matching the target task with processing nodes by the provisioning apparatus. All the processing nodes in the pool with the component metric information exceeding the task characteristic information are selected. For example, processing nodes which have a maximum metric information of each component exceeding an average of each corresponding task characteristic information are selected from the pool of processing nodes, out of which one or more processing nodes are determined as the second set of processing nodes.

Further, when the above described second condition is utilized to determine the second set of processing nodes, the critical characteristics of the task characteristic information are satisfied according to priority levels with the obtained component metric information of the processing nodes in the pool during the matching of the target task with processing nodes by the provisioning apparatus. Critical characteristics refer to one or more most demanding resource requirements of the target task for the components. For example, relative ratios of the task characteristics corresponding to the metric information for each component of the processing nodes are ranked in a descending order, based on which the corresponding processing nodes are selected. In other words, those processing nodes satisfying the most demanding critical characteristics are selected to generate a first candidate set of processing nodes, from which the processing nodes satisfying the second most demanding critical characteristics and at the same time satisfying the most demanding characteristic in a minimal degree are selected to generate a second candidate set of processing nodes. From the second candidate set of processing nodes, those satisfying the third demanding characteristic and at the same time satisfying the second most demanding characteristic in a minimal degree are selected to generate the third candidate set of processing nodes, and so forth until a final set of processing nodes are generated to best satisfy the task characteristics of the target task.

In an example where a target task has critical characteristic as the requirement for storage I/O bandwidth, the second critical characteristic as the requirement for memory bandwidth, and third characteristic as the requirement for CPU capacity and the lowest characteristics as the requirement for the network bandwidth, the provisioning apparatus selects from its managed pool of processing nodes all the processing nodes that satisfy the storage I/O bandwidth requirement to generate a first candidate set of processing nodes. Then, the provisioning apparatus selects from the first candidate set the processing nodes that satisfy the memory bandwidth requirement and at the same time have a lowest amount of storage I/O bandwidth to generate a second candidate set of processing nodes. Next, the provisioning apparatus selects from the second candidate set processing nodes that satisfy the CPU requirement and at the same time have the lowest amount of memory bandwidth to generate a third candidate set of processing nodes. Finally, the provisioning apparatus selects from the third candidate set processing nodes that satisfy the requirement of network bandwidth and at the same time have the lowest amount of CPU capacity to generate a final set of processing nodes.

When more than one processing nodes are included in the final set of processing nodes, the provisioning apparatus can, for example, randomly select one or more processing nodes, e.g., the second set of processing nodes, from the final set and deploy the target task to the second set of the processing nodes. With this selection of the second set of processing nodes, not only the relatively most demanding critical resource requirements for storage I/O bandwidth and memory bandwidth are satisfied with respect to priority, but also the resources of less demanded CPU and network bandwidth are not wasted, ensuring fast execution of the target task, thereby increasing the overall resource usage rate, and decreasing power consumption associated with the execution of the task.

Further, when the above described third condition is utilized to determine the second set of processing nodes, the critical characteristics of the task characteristic information are satisfied with respect to priority by the obtained component metric information of the processing nodes, and the remaining task characteristics are satisfied with the overall component metric information that exceeds and most approximates the overall task characteristics corresponding to the task characteristic information of the target task, upon matching the target task with processing nodes by the provisioning apparatus. Critical characteristics are the one or more task characteristics that mostly constrain the execution speed of a target task. First, all the critical characteristics are satisfied for the execution of the target task. For example, with a target task having critical characteristics as the requirements for CPU capacity and memory bandwidth, all the processing nodes that have a maximum CPU capacity and a maximum memory bandwidth are selected from the pool of the processing nodes to generate a candidate set of processing nodes. Next, the remaining component metric information is compared with the remaining task characteristic information of the target task to select all the processing nodes having the remaining component metric information exceeding the remaining corresponding task characteristic information from the candidate set of processing nodes. For example, all the processing nodes that have a maximum metric information for each remaining component exceeding an average characteristic of the corresponding remaining task characteristic information are selected from the candidate set to generate a second candidate set. Next, for each processing node in the second candidate set, the difference between a maximum of metric information and the respective average task characteristic information is computed for each remaining task characteristic, the result of which is utilized to generate an average of all the computed difference for each processing node in the second candidate set. Next, the averages for all the processing nodes in the second candidate set are ranked to determine one or more processing nodes having a minimum computed difference average. The determined one or more processing node generate the second set of processing nodes.

In some other embodiments, the method 500 further includes a step S18 (not shown), where critical task characteristics corresponding to the task characteristic information of the target task is determined based on the obtained task characteristic information and the obtained component metric information of the processing nodes in the pool. Critical characteristics indicate the one or more most demanding resource requirements by the target task for a processing node. For example, a target task can have a most demanding requirement for memory bandwidth, without which being satisfied, the execution speed of the target task is hindered and delayed, even when the target task is running on a processing node having a large CPU capacity. In this case, the memory bandwidth is a critical characteristic of the target task.

One exemplary approach to determine critical characteristics for a target task is to compute a relative ratio of each task characteristic and respective component metric information corresponding to all the processing nodes in the pool of processing nodes. In particular, an average of each task characteristic during a time period can be computed by analyzing each task characteristics of the target task. For example, during a period of time, an average of CPU usage of CPUtask, an average of memory bandwidth usage MEMtask, an average of storage I/O speed IOPStask, an average of storage I/O bandwidth usage IOtask, and an average of network bandwidth usage NETtask can be obtained for a target task. Next, the maximum values of the component metric information of all the processing nodes in the pool managed by the provisioning apparatus are ranked for each component respectively to obtain a maximum value and a minimum value for each component. For example, with a provisioning apparatus managing 5 processing nodes, a maximum CPU capacity of CPUnode (in the unit of Glops), maximum memory bandwidth of MEMnode (in the unit of MB/s), maximum storage I/O speed of IOPSnode (in the unit of IOPS), maximum storage I/O bandwidth of IOnode (in the unit of MB/s), and maximum network bandwidth of NETnode (in the unit of MB/s) are obtained for each of the 5 processing nodes respectively. Each series of the 5 maximum values of the corresponding components are ranked to determine for the 5 processing nodes, a maximum CPU capacity CPUmax and a minimum CPU capacity CPUmin, a maximum memory bandwidth MEMmax and a minimum memory bandwidth MEMmin, a maximum storage I/O speed IOPSmax and a minimum storage I/O speed IOPSmin, a maximum storage I/O bandwidth IOmax and a minimum storage I/O bandwidth IOmin, and a maximum network bandwidth NETmax and a minimum network bandwidth NETmin.

Then, relative ratios of the target task's task characteristics and the component metric information corresponding to all the processing nodes in the pool are computed. For example, a relative ratio of CPUscore can be computed with an exemplary formula of CPUscore=(CPUtask−CPUmin)/(CPUmax−CPUmin); a relative ratio of MEMscore can be computed by an exemplary formula of MEMscore=(MEMtask−MEMmin)/(MEMmax−MEMmin); a relative ratio of IOPSscore can be computed by an exemplary formula of IOPSscore=(IOPStask−IOPSmin)/(IOPSmax−IOPSmin); a relative ratio of IOscore can be computed by an exemplary formula of IOscore=(IOtask−IOmin)/(IOmax−IOmin); and a relative ratio of NETscore can be computed by an exemplary formula of NETscore=(NETtask−NETmin)/(NETmax−NETmin). Lastly, threshold values can be configured for those relative ratios. For example, an exemplary threshold value can be configured as 0.5, and any task characteristic corresponding to a relative ratio exceeding 0.5 is determined as the critical characteristic. The determination of critical characteristics corresponding to the task characteristic information of a target task allows the determination of the most demanding resource requirements by the target task during the execution for the processing nodes, contributing to a higher degree of reasonableness and accuracy of resource provisioning.

In some other embodiments, the method 500 can further include steps S18 (not shown) and S19 (not shown). In step S18, the provisioning apparatus receives user inquiry requests from users. In step S19, the provisioning apparatus provides the responses to the received user inquiry requests to the user. User inquiry requests refer to requests from the user to inquire about the status of the processing nodes managed by the provisioning apparatus, or the execution status a target task running on one or more processing nodes managed by the provisioning apparatus. After receiving an inquiry request, the provisioning apparatus responds to the user based on the monitoring data collected regarding the execution of the target task and/or the status of the processing nodes.

In some embodiments, a response to a user inquiry includes at least one the following: task provisioning information corresponding to the inquired task by the user; task execution information corresponding the inquired task by the user; or node execution status information corresponding to inquired processing nodes by the user. In particular, an inquired task refers to a task submitted by the user to the provisioning apparatus in an deployment request. Therefore, the user can inquire about all the tasks submitted to the provisioning apparatus under the user's account, regarding information such as, for example, task provisioning information, e.g., the information regarding the processing nodes, on which the task has been, currently is, and/or will be deployed, in relation with the task. Similarly, the user can inquire about the present and historical execution status of the task, and the execution status of the corresponding processing nodes.

It is appreciated by one of the ordinary skill in the art that the above described obtaining of component metric information of the pool of processing nodes, obtaining of task characteristic information of a target task running on a first set of processing nodes, determination of a second set of processing nodes, and determination of critical characteristics are merely examples, any other suitable and/or well-known methods that already exist or will become available in the future, are within the scope of the present disclosure.

Further, in step S15, the provisioning apparatus obtains a task deployment request corresponding to the target task. In step S16, a first set of processing nodes in the pool of processing nodes managed by the provisioning apparatus is determined based on the component metric information of the pool of processing nodes. In step S17, the target task is deployed to the first set of processing nodes for execution.

In particular, the target task deployment request received in step S15 is sent by a user or other provisioning apparatus to the present provisioning apparatus in order to request deployment of a target task, which has not been executed on any processing nodes managed by the provisioning apparatus, on one or more of the processing nodes managed by the provisioning apparatus for execution. In some other embodiments, a target task deployment request can include all the types of requests related to the target task being executed on one or more of the processing nodes managed by the provisioning apparatus.

Next, in step S16, a first set of processing nodes from the pool of the processing nodes managed by the provisioning apparatus are determined to match the resource requirements of the target task based on the component metric information of the pool of the processing nodes. Here, the component metric information of the processing nodes in the pool is obtained by the provisioning apparatus. After receiving a deployment request for a target task, the provisioning apparatus determines one or more processing nodes in the pool that are best suited for executing the target task based on an overall analysis of the component metric information of the pool of processing nodes. The selection of the first set of processing nodes achieves the purpose of starting to analyze task characteristic information for the target task in execution and avoiding elongated hold-time before the target task is deployed for execution.

In order to provide fast task deployment and to avoid the hardware constraints of the processing nodes causing errors in obtaining the task characteristic information for the target task, the component metric information of the processing nodes in the pool is ranked according to an overall capability to select one or more presently idle processing nodes having a best overall capacity as the first set of processing nodes. For example, all the processing nodes in the pool having metric information of each component exceeding an average metric information of all the presently idle processing nodes in an exemplary scale of from about 10 percent to about 30 percent. The selection of the first set of processing nodes from the pool to match the resource requirements of the target task allows for the target task to start execution as soon as possible, avoids delays in deployment and queued up tasks. At the same time, the first set of processing nodes with the target task deployed thereon can start obtaining task characteristic information for the target task, contributing to the determination of the second set of processing nodes, increasing the execution speed of the target task, maximizing resource usage and decreasing power consumption associated with the execution of tasks.

Further, in step S17, the target task is deployed to the above described first set of processing nodes for execution. By use of the analysis of the overall component metric information of the processing nodes in the pool, the processing nodes that allow for a maximum execution speed of the target task and minimal constraints by the hardware resources are determined as the first set of processing nodes. The provisioning apparatus deploys the target task to the first set of processing nodes to decrease the wait-time for the target task, and at the same time to start to obtain the task characteristic information of the target task.

It is appreciated by one of the ordinary skill in the art that the above described determination of a first set of processing nodes is merely an example, any other suitable and/or well-known methods that already exist or will become available in the future, are within the scope of the present disclosure.

Figure 6:
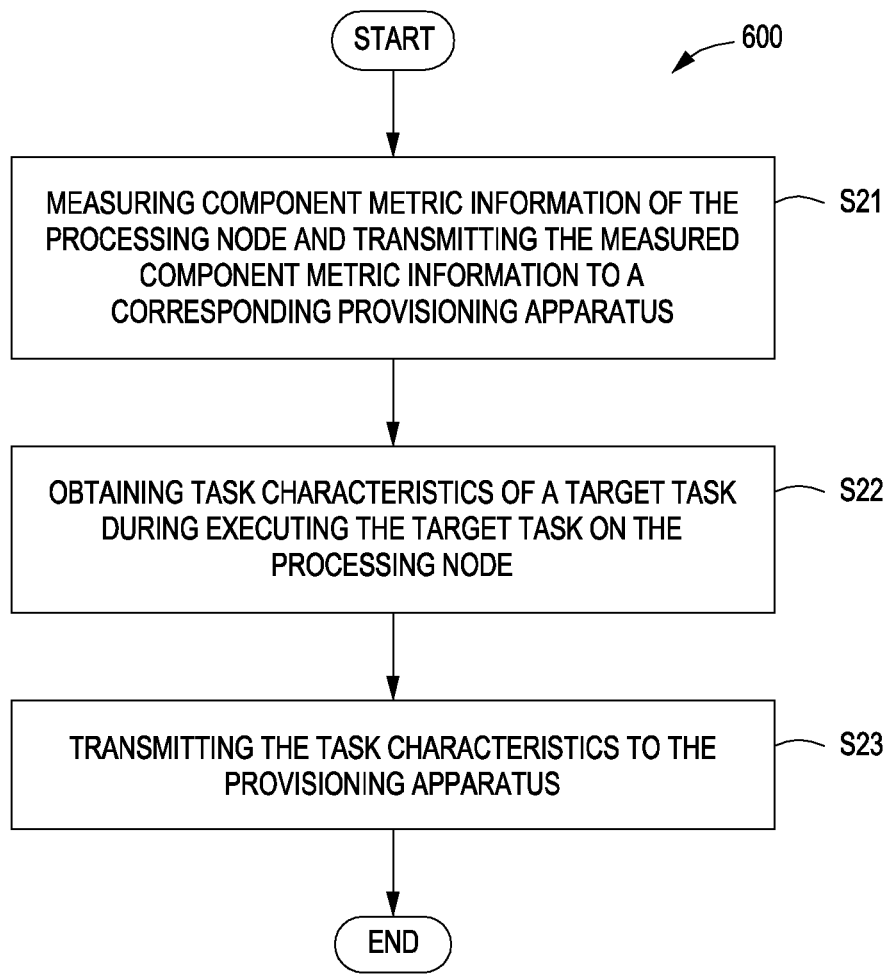
FIG. 6 is a flow chart of an exemplary computer implemented method of resource provisioning by a processing node in accordance with an embodiment of the present disclosure.

Referring to FIG. 6, a flow chart of an exemplary method of a processing node for resource provisioning in accordance with embodiments of the present disclosure is shown. Method 600 starts in step S21, where the metric of the components of the processing node is measured and transmitted to the corresponding provisioning apparatus. In step S22, the task characteristic information for the target task during its execution on the processing node is obtained. In step S23, the obtained task characteristic information of the target task is transmitted to the corresponding provisioning apparatus.

In particular, the components of which the component metric is measured are the components of the one of the processing nodes managed by the provisioning apparatus. The components measured include, but are not limited to, the hardware and network resources of the processing node, such as, for example, a complete set of hardware having at least a set of resources including CPU, memory, storage, network, etc., capable of executing a target task. Component metric information includes, but is not limited to, hardware and network related performance information such as, for example, CPU capacity, memory bandwidth, storage I/O speed and bandwidth, network bandwidth, etc. Measuring component metric information can be implemented by, for example, installing a daemon program on the processing node to periodically measure and collect the components performance data. In some embodiments, the measured component metric information includes a maximum value and a minimal value. For example, a maximum value of CPU capacity, CPUnode, in the unit of Gflops, a maximum value of memory bandwidth, MEMnode, in the unit if MB/s, a maximum value of storage I/O speed, IOPSnode, in the unit of IOPS, a maximum value of storage I/O bandwidth, IOnode, in the unit of MB/s, a maximum value of network bandwidth, NETnode, in the unit of MB/s, etc. The measured component metric information is transmitted from the processing node to the provisioning apparatus such that, during the resource provisioning, the status of all the processing nodes can be more accurately identified, contributing to more reasonable resource provisioning.

Next, in step S22, the task characteristic information for the target task is obtained during the execution of the target task. Here, the target task refers to a task that is being executed by the present processing node. Task characteristics include, for example, CPU capability, memory bandwidth, storage I/O speed and bandwidth, network bandwidth, etc. Multiple approaches can be implemented to obtain task characteristic information of a target task. For example, a backend operating framework can collect and compute the corresponding task characteristic information of the target task during the processing node's execution of the task. Alternatively, at corresponding processing nodes, a monitoring module can be installed to monitor the execution status and to perform statistics over the monitored status to obtain the task characteristic information. Alternatively, a daemon program can be installed at the processing node executing the target task to measure the execution status periodically and to analyze and obtain the task characteristics of the target task over a period of time. Finally, the obtained task characteristics are transmitted by the processing node to the provisioning apparatus. By obtaining the task characteristics of the target task running on the processing node, and the resource requirements, such as the requirements for the hardware and network resources by the target task, can be better determined, thereby contributing to the higher degree of accuracy and speed of resource provisioning.

Next, in step S23, the task characteristic information is transmitted to the provisioning apparatus. Here, the provisioning apparatus refers to the provisioning apparatus which manages the processing node on which the target task is running. The method of transmitting to the provisioning apparatus can be, for example, by use of the system that includes both the provisioning apparatus and the processing node. By transmitting the task characteristic information to the provisioning apparatus, the provisioning apparatus can better identity the task characteristics to more effectively match the resources for the target task, thereby ensuring the provisioned processing nodes satisfy the resource requirements of the target task and at the same time avoiding wasting node resources because of over-provisioning.

Further, in step S24 (not shown), the target task deployed by the provisioning apparatus to the processing node is executed. Here, the target task deployed by the provisioning apparatus to the processing node includes a target task which is deployed to the processing node managed by the provisioning apparatus and the analysis of the task characteristics of which is started for the first time. The target task also includes a task, which, after its task characteristic have already been analyzed, is to be executed after the matching of the resource nodes and the target task. Also, the processing nodes, on which the target task is executed for the first time or is executed after matching the resource nodes with the target task, can be the same or different processing nodes. Since a processing node which executes the target task for the first time, e.g., a processing node in the first set, can be selected as one of the processing nodes in the second set upon matching, such processing node has a possibility of being selected as the processing node best suited for executing the target task as well. In this scenario, the target task does not need to be deployed a second time to another processing node.

In step S25 (not shown), critical characteristic information corresponding to the target task's characteristic information is determined based on the task characteristic information and the component metric information of the pool of processing nodes. When the task characteristic information transmitting module transmits the task characteristic information to the provisioning apparatus, the critical task characteristics are included therein.

After the component metric information of the first set of processing nodes is collected by each processing node in the pool and transmitted to the provisioning apparatus, the provisioning apparatus transmits to each processing node in the pool the component metric information of the other processing nodes in the pool. Therefore, each of the processing nodes in the pool has the component metric information of the other processing nodes in the pool and managed by the same provisioning apparatus. Critical characteristics indicate the one or more most demanding resource requirements by the target task for a processing node. For example, a target task can have a most demanding requirement for memory bandwidth, without which being satisfied, the execution speed of the target task is hindered and delayed, even when the target task is running on a processing node having a large CPU capacity. In this case, the memory bandwidth is a critical characteristic of the target task.

One exemplary approach to determine critical characteristics for a target task is to compute a relative ratio of each task characteristic and respective component metric information corresponding to all the processing nodes in the pool of processing nodes. Such relative ratio indicates to a certain degree the demand level for a resource requirement by the target task. In particular, an average of each task characteristic during a period of time can be computed by analyzing each task characteristics of the target task. For example, during a period of time, an average of CPU usage of CPUtask, an average of memory bandwidth usage MEMtask, an average of storage I/O speed IOPStask, an average of storage I/O bandwidth usage IOtask, and an average of network bandwidth usage NETtask can be obtained for a target task.

Next, the maximum values of the component metric information of all the processing nodes in the pool managed by the provisioning apparatus are ranked for each component respectively to obtain a maximum value and a minimum value for each component. For example, with a provisioning apparatus managing 5 processing nodes, a maximum CPU capacity of CPUnode (in the unit of Glops), maximum memory bandwidth of MEMnode (in the unit of MB/s), maximum storage I/O speed of IOPSnode (in the unit of IOPS), maximum storage I/O bandwidth of IOnode (in the unit of MB/s), and maximum network bandwidth of NETnode (in the unit of MB/s) are obtained for each of the 5 processing nodes respectively. Each series of the 5 maximum values of the corresponding components are ranked to determine for the 5 processing nodes, a maximum CPU capacity, CPUmax, and a minimum CPU capacity, CPUmin, a maximum memory bandwidth, MEMmax, and a minimum memory bandwidth, MEMmin, a maximum storage I/O speed, IOPSmax, and a minimum storage I/O speed, IOPSmin, a maximum storage I/O bandwidth, IOmax, and a minimum storage I/O bandwidth IOmin, and a maximum network bandwidth, NETmax, and a minimum network bandwidth, NETmin.

Then, relative ratios of the target task's task characteristics and the component metric information corresponding to all the processing nodes in the pool are computed. For example, a relative ratio of CPUscore can be computed with an exemplary formula of CPUscore=(CPUtask−CPUmin)/(CPUmax−CPUmin); a relative ratio of MEMscore can be computed by an exemplary formula of MEMscore=(MEMtask−MEMmin)/(MEMmax−MEMmin); a relative ratio of IOPSscore can be computed by an exemplary formula of IOPSscore=(IOPStask−IOPSmin)/(IOPSmax−IOPSmin); a relative ratio of IOscore can be computed by an exemplary formula of IOscore=(IOtask−IOmin)/(IOmax−IOmin); and a relative ratio of NETscore can be computed by an exemplary formula of NETscore=(NETtask−NETmin)/(NETmax−NETmin). Lastly, threshold values can be configured for those relative ratios. For example, an exemplary threshold value can be configured as 0.5, and any task characteristic corresponding to a relative ratio exceeding 0.5 is determined as the critical characteristic. After determining the critical characteristics corresponding to the task characteristic information of a target task, the critical characteristics are transmitted by the processing nodes that determine such critical characteristics to the provisioning apparatus, thereby allowing the provisioning apparatus to accurately identify the most demanding resource requirements by the target task for a processing node such that to obtain a higher degree of effectiveness and accuracy of resource provisioning.

Further, in step S26 (not shown), it is detected whether the triggering conditions are met for the purpose of transmitting the collected task characteristics to the provisioning apparatus. With the detection of the triggering condition, in step S23, the task characteristic information is transmitted to the provisioning apparatus when the triggering module detects the triggering conditions being affirmatively met. When a target task executes on one of the processing nodes managed by the provisioning apparatus and starts to collect task characteristic information for the first time, there might be instances where the target task halts its execution during the information collecting, or the hardware of the processing node malfunctions, resulting in the collection of inaccurate task characteristic information. Therefore, it is necessary to configure a condition to trigger transmission of task characteristic information to the provisioning apparatus to avoid the above described error situation and to increase system reliability.

In some embodiments, a triggering condition includes at least one of the following: the task characteristic collecting duration corresponding to the task character information exceeding a pre-configured threshold collecting time duration; the execution duration of the target task on the processing node exceeding a pre-configured threshold execution time duration. Here, the use of a pre-configured threshold collecting time duration can prevent the transmitting of inaccurate task characteristic information to the provisioning apparatus when the hardware of the processing node executing the target task malfunctions and pauses the collecting of the task characteristic information. In other words, when the collecting duration exceeds the pre-configured threshold time duration, the collected task characteristic information will not be transmitted to the provisioning apparatus. Similarly, the use of a pre-configured threshold execution time duration also prevents the transmitting of inaccurate task characteristic information to the provisioning apparatus when the target task halts its execution due to its own programming defect and causes the collection of inaccurate task characteristic information. When the target task execution duration exceeds the pre-configured threshold execution duration, the collected task characteristic information will not be transmitted to the provisioning apparatus either. The use of those thresholds to trigger transmission of the task characteristic information can increase the accuracy of the task characteristic information provided by the processing nodes.

It is appreciated by one of the ordinary skill in the art that the above described obtaining of task characteristic information, determination of the critical task characteristic information, and detecting of the triggering conditions are merely examples, any other suitable and/or well-known methods that already exist or will become available in the future, are within the scope of the present disclosure.

Figure 7:
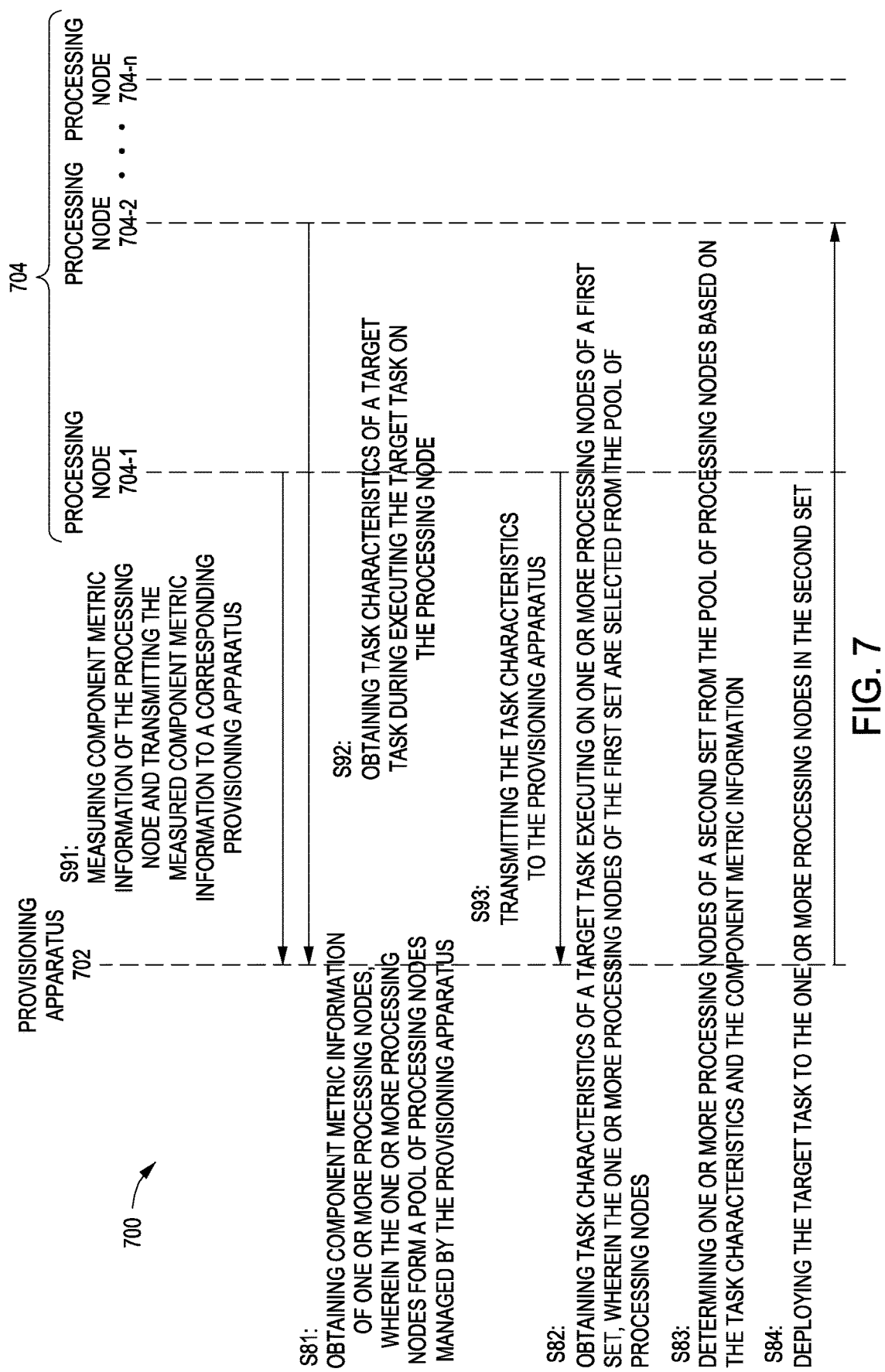
FIG. 7 is an illustration of an exemplary computer implemented method of resource provisioning by collaboration of a provisioning apparatus and processing nodes in accordance with an embodiment of the present disclosure.

Referring to FIG. 7, an illustration of an exemplary method of resource provisioning by collaboration of an exemplary provisioning apparatus and an exemplary processing nodes in accordance with embodiments of the present disclosure is shown. A system 700 includes a provisioning apparatus 702 and a plurality of processing nodes 704 (704-1, 704-2, . . . , 704-$n$). In step S91, the processing nodes 704 measure the component metric information thereof and transmit the measured metric information to the provisioning apparatus 702, which manages the plurality of processing nodes 704. The provisioning apparatus 702 receives the component metric information in step S81. When a user submits to the provisioning apparatus 702 a target task deployment request, the provisioning apparatus determines a pool of processing nodes out of the plurality of processing nodes 704 such that the processing nodes in the pool are suitable for execution the submitted target task, based on the component metric information the plurality of processing nodes 704 sent thereto. The pool of the processing nodes can be updated according to the resource availability of the plurality of processing nodes 704. For example, a processing node may be running low in terms of its component resource at the time of the provisioning apparatus determines the pool of the processing nodes for the target task, but that particular processing node may also complete its prior tasks and become a node having sufficient resources for executing the target task. In this case, the provisioning apparatus 702 can supplement the determined pool of processing nodes with this newly available suitable node. After the determination of the pool of processing nodes, the provisioning apparatus further determines a first set of processing nodes out of the pool, the details of which are substantially similar to those described in the apparatus and method embodiments; and deploys the target task to the first set of processing nodes 704-1 for execution. At the same time, in some embodiments, the provisioning apparatus 702 also instructs the corresponding nodes in the first set to start collecting task characteristic information upon running of the target task (not shown). In step S92, during the execution of the target task on the first set of processing nodes, the corresponding processing nodes 704 obtains the task characteristic information and transmits the obtained characteristics to the provisioning apparatus 702 in step S93. In step S82, the provisioning apparatus 702 receives the task characteristic information and in step S83, determines a second set of processing nodes from the pool of processing nodes to match the resource requirements of the target task, based on the task characteristic information and the component metric information. In step S84, the provisioning apparatus 702 deploys the target task from the first set of processing node 704-1 to the second set of processing nodes 704-2.

Embodiments of the present disclosure can be implemented using software, hardware, firmware, and/or the combinations thereof. Regardless of being implemented using software, hardware, firmware or the combinations thereof, instruction code can be stored in any kind of computer readable media (for example, permanent or modifiable, volatile or non-volatile, solid or non-solid, fixed or changeable medium, etc.). Similarly, such medium can be implemented using, for example, programmable array logic (PAL), random access memory (RAM), programmable read only memory (PROM), read only memory (ROM), electrically erasable programmable ROM (EEPROM), magnetic storage, optical storage, digital versatile disc (DVD), or the like.

It is necessary to point out that, modules or blocks described by embodiments of the present disclosures are logical modules or logical blocks. Physically, a logical module or logical block can be a physical module or a physical block, a part of a physical module or a physical block, or the combinations of more than one physical modules or physical blocks. Physical implementation of those logical module or logical blocks is not of essence. The realized functionalities realized by the modules, blocks and the combinations thereof are key to solving the problems addressed by the present disclosure. Further, in order to disclose the novelties of the present disclosure, the above described embodiments do not disclose about those modules or blocks not too related to solving the problems addressed by the present disclosure, which does not mean that the above described embodiments cannot include other modules or blocks.

It is also necessary to point out that, in the claims and specification of the present disclosure, terms such as first and second only are for distinguishing an embodiment or an operation from another embodiment or operation. It does not require or imply that those embodiments or operations having any such real relationship or order. Further, as used herein, the terms "comprising," "including," or any other variation intended to cover a non-exclusive inclusion, such that a process, method, article, or apparatus that comprises a list of elements does not include only those elements but may include other elements not expressly listed or inherent to such process, method, article, or apparatus. Absent further limitation, elements recited by the phrase "comprising a" does not exclude a process, method, article, or apparatus that comprises such elements from including other same elements.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable medium used to actually carry out the distribution. The embodiments disclosed herein may also be implemented using software modules that perform certain tasks. These software modules may include script, batch, or other executable files that may be stored on a computer-readable storage media or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present disclosure and its advantages have been described in detail, it should be understood that various changes substitutions, and alterations can be made herein without departing from the spirit and scope of the disclosure as defined by the appended claims. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A method of allocating computer resources, the method comprising:
    receiving a request to execute a task, the task having a required resource necessary to execute the task, the required resource having a required amount of resource usage;
    allocating a first processing node to the task from a pool of processing nodes, the first processing node having the required resource, the required resource in the first processing node being sufficient to satisfy the required amount of resource usage;
    monitoring an execution of the task on the first processing node to determine an actual amount of resource usage by the required resource;
    determining one or more available processing nodes from the pool of processing nodes, each available processing node having the required resource, the required resource in each available processing node having an available amount of resource usage that is greater than the actual amount of resource usage;
    determining a second processing node from the one or more available processing nodes, the second processing node having a smallest difference between the available amount of resource usage and the actual amount of resource usage, wherein the smallest difference is a largest ratio of the actual amount of resource usage divided by the available amount of resource usage;
    allocating the second processing node to the task; and
    transferring the task from the first processing node to the second processing node.

2. The method of claim 1, wherein the required resource includes a CPU resource, a memory resource, an input/output (I/O) resource, or a network resource.

3. The method of claim 2, wherein the required amount of resource usage includes CPU capability, memory bandwidth, storage I/O speed and bandwidth, or network bandwidth.

4. The method of claim 1, wherein the request identifies the required resource.

5. The method of claim 4, wherein the task has not been previously executed by the pool of processing nodes.

6. A method of allocating computer resources, the method comprising:
    receiving a request to execute a task, the task having a plurality of required resources necessary to execute the task, each required resource having a required amount of resource usage;
    allocating a first processing node from a pool of processing nodes, the first processing node having the plurality of required resources, the plurality of required resources in the first processing node being sufficient to satisfy the required amount of resource usage by each required resource;
    monitoring an execution of the task on the first processing node to determine a plurality of actual amounts of resource usage by the plurality of required resources;
    determining one or more available processing nodes from the pool of processing nodes, each available processing node having the plurality of required resources, the required resources in each available processing node having available amounts of resource usage that are greater than the actual amounts of resource usage for the required resources;
    determining a second processing node from the one or more available processing nodes, the second processing node having a smallest difference between an available amount of resource usage and an actual amount of resource usage, wherein the smallest difference is a largest ratio of the actual amount of resource usage divided by the available amount of resource usage;
allocating the second processing node to the task; and
transferring the task from the first processing node to the second processing node.

7. The method of claim 6, wherein the plurality of required resources includes a number of critical resource requirements.

8. The method of claim 7, wherein:
the number of critical resource requirements includes a most demanding critical resource requirement and a second most demanding critical resource requirement, and
determining one or more available processing nodes includes determining a first set of processing nodes from the pool of processing nodes that each satisfy the most demanding critical resource requirement, and from the first set of processing nodes, determining a second set of processing nodes that each satisfy the second most demanding critical resource requirement.

9. The method of claim 8, wherein the task has not been previously executed by the pool of processing nodes.

10. A resource provisioning system, comprising:
a pool of processing nodes; and
provisioning apparatus coupled to the pool of processing nodes, the provisioning apparatus to:
receive a request to execute a task, the task having one or more required resources necessary to execute the task, the required resources each having a required amount of resource usage;
allocate a first processing node from the pool of processing nodes, the first processing node having the plurality of required resources, the plurality of required resources in the first processing node being sufficient to satisfy the required amount of resource usage by each required resource;
monitor an execution of the task on the first processing node to determine one or more actual amounts of resource usage by the one or more required resources;
determine one or more available processing nodes from the pool of processing nodes, each available processing node having the plurality of required resources, the required resources in each available processing node having available amounts of resource usage that are greater than the actual amounts of resource usage for the required resources;
determine a second processing node from the one or more available processing nodes, the second processing node having a smallest difference between an available amount of resource usage and an actual amount of resource usage, wherein the smallest difference is a largest ratio of the actual amount of resource usage divided by the available amount of resource usage;
allocate the second processing node to the task; and
transfer the task from the first processing node to the second processing node.

11. The system of claim 10, wherein the required resources include one or more of a CPU resource, a memory resource, an input/output (I/O) resource, and a network resource.

12. The system of claim 11, wherein the required amount of resource usage for a required resource includes CPU capability, memory bandwidth, storage I/O speed and bandwidth, or network bandwidth.

13. The system of claim 10, wherein the one or more required resources includes a number of critical resource requirements.

14. The system of claim 13, wherein:
the number of critical resource requirements includes a most demanding critical resource requirement and a second most demanding critical resource requirement; and
the provisioning apparatus determines one or more available processing nodes to include determining a first set of processing nodes from the pool of processing nodes that each satisfy the most demanding critical resource requirement, and from the first set of processing nodes, determining a second set of processing nodes that each satisfy the second most demanding critical resource requirement.

15. The system of claim 14, wherein the task has not been previously executed by the pool of processing nodes.

16. A non-transitory computer-readable medium operably coupled to a processor, the non-transitory computer-readable medium having computer-readable instructions stored thereon which, when executed by the processor, cause the processor to execute a method of allocating computer resources, the method comprising:
receiving a request to execute a task, the task having a required resource necessary to execute the task, the required resource having a required amount of resource usage;
allocating a first processing node to the task from a pool of processing nodes, the first processing node having the required resource, the required resource in the first processing node being sufficient to satisfy the required amount of resource usage;
monitoring an execution of the task on the first processing node to determine an actual amount of resource usage by the required resource;
determining one or more available processing nodes from the pool of processing nodes, each available processing node having the required resource, the required resource in each available processing node having an available amount of resource usage that is greater than the actual amount of resource usage;
determining a second processing node from the one or more available processing nodes, the second processing node having a smallest difference between the available amount of resource usage and the actual amount of resource usage, wherein the smallest difference is a largest ratio of the actual amount of resource usage divided by the available amount of resource usage;
allocating the second processing node to the task; and
transferring the task from the first processing node to the second processing node.

17. The medium of claim 16, wherein the request identifies the required resource.

18. The medium of claim 16, wherein the required resource includes a CPU resource, a memory resource, an input/output (I/O) resource, or a network resource.

19. The medium of claim 18, wherein the required amount of resource usage includes CPU capability, memory bandwidth, storage I/O speed and bandwidth, or network bandwidth.

* * * * *